United States Patent [19]

Hall

[11] Patent Number: 5,578,878
[45] Date of Patent: Nov. 26, 1996

[54] COUNTERBALANCED ELECTRIC MOTOR

[75] Inventor: Robert D. Hall, Berkey, Ohio

[73] Assignee: United Technologies Motor Systems, Inc., Dearborn, Mich.

[21] Appl. No.: 298,103

[22] Filed: Aug. 30, 1994

[51] Int. Cl.$^6$ .............................. H02K 5/24; H02K 1/06; H02K 1/26

[52] U.S. Cl. .......................... 310/51; 310/217; 310/193; 310/264

[58] Field of Search ............................... 310/51, 81, 179, 310/195, 216, 217, 261, 264, 193

[56] References Cited

U.S. PATENT DOCUMENTS

| | | | |
|---|---|---|---|
| 1,980,698 | 11/1934 | Readon | 171/206 |
| 2,395,514 | 2/1946 | Stoller | 171/123 |
| 3,214,621 | 10/1965 | Eflin et al. | |
| 3,315,105 | 4/1967 | Moore | |
| 3,778,892 | 12/1973 | Ostroski | 29/598 |
| 3,831,268 | 8/1974 | Boyd et al. | |
| 3,882,336 | 5/1975 | Boyd et al. | |
| 4,545,021 | 10/1985 | Suzuki et al. | |
| 4,660,283 | 4/1987 | Yasunaka | |
| 4,888,866 | 12/1989 | Hansen | 29/598 |
| 5,107,159 | 4/1992 | Kordik | 310/156 |
| 5,228,645 | 7/1993 | Reinicke | 251/77 |
| 5,304,885 | 4/1994 | Wong et al. | |

FOREIGN PATENT DOCUMENTS

| | | |
|---|---|---|
| 1613291 | 1/1971 | Germany . |
| 1283037 | 11/1989 | Japan . |
| 6006944 | 1/1994 | Japan . |
| 120033 | 3/1945 | Netherlands . |
| 1245285 | 11/1968 | United Kingdom . |
| 2203597 | 10/1988 | United Kingdom . |
| 2208974 | 4/1989 | United Kingdom . |
| 2222317 | 2/1990 | United Kingdom . |

*Primary Examiner*—Steven L. Stephan
*Assistant Examiner*—Jonathan Link
*Attorney, Agent, or Firm*—William W. Habelt

[57] ABSTRACT

An armature assembly 50 for an electric motor 10 is inherently balanced despite the presence of a secondary shaft 74 extending from a primary armature shaft 72 longitudinally along an eccentric axis 75 offset radially from the longitudinal axis 15 of the primary armature shaft 72. A lamination stack 60 mounted on the armature shaft 70 is formed of a plurality of lamination plates 62 arrayed in abutting face-to-face relationship. The lamination plates 62B and 62C provided at the respective ends of the stack 60 are modified in that some of the radially directed spokes 66 are removed along a selected portion or spaced portions 63,67 of the circumferential extent of the hub portion 64 so as to provide counterweight lamination plates having a spoke pattern which is not symmetric about the longitudinal axis 15 of the primary shaft 72.

8 Claims, 2 Drawing Sheets

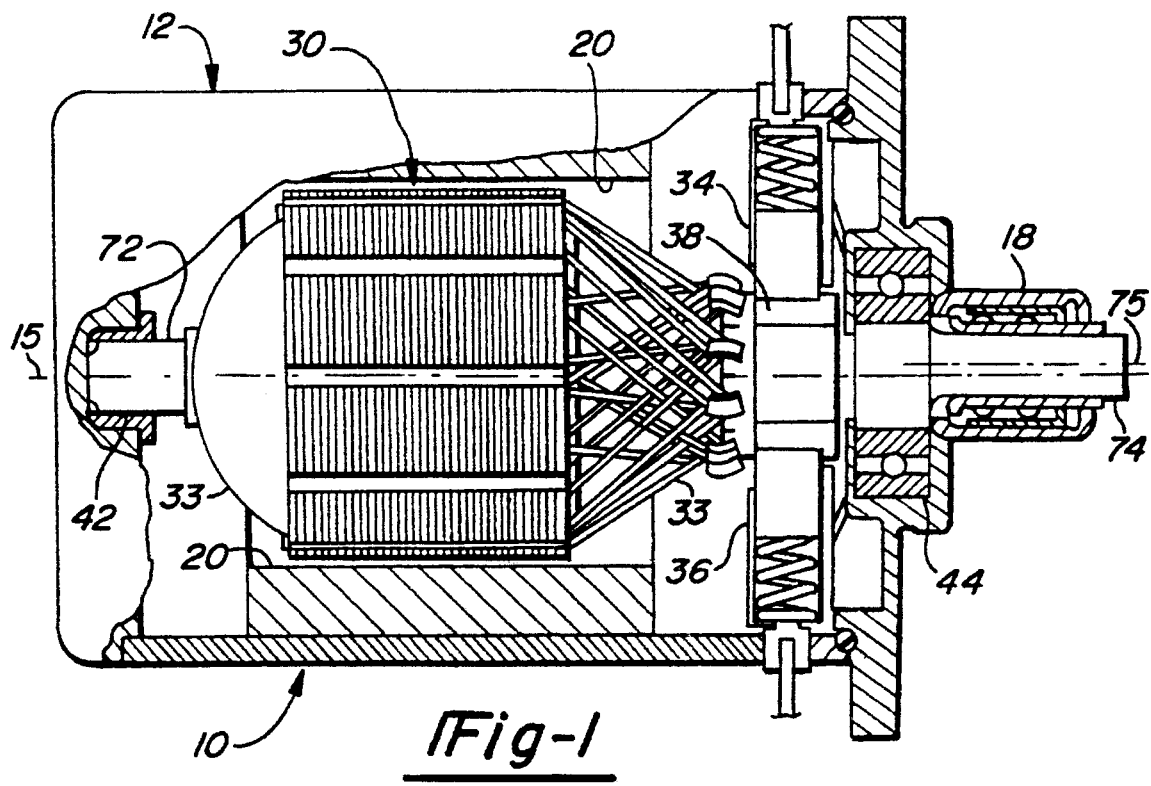
Fig-1
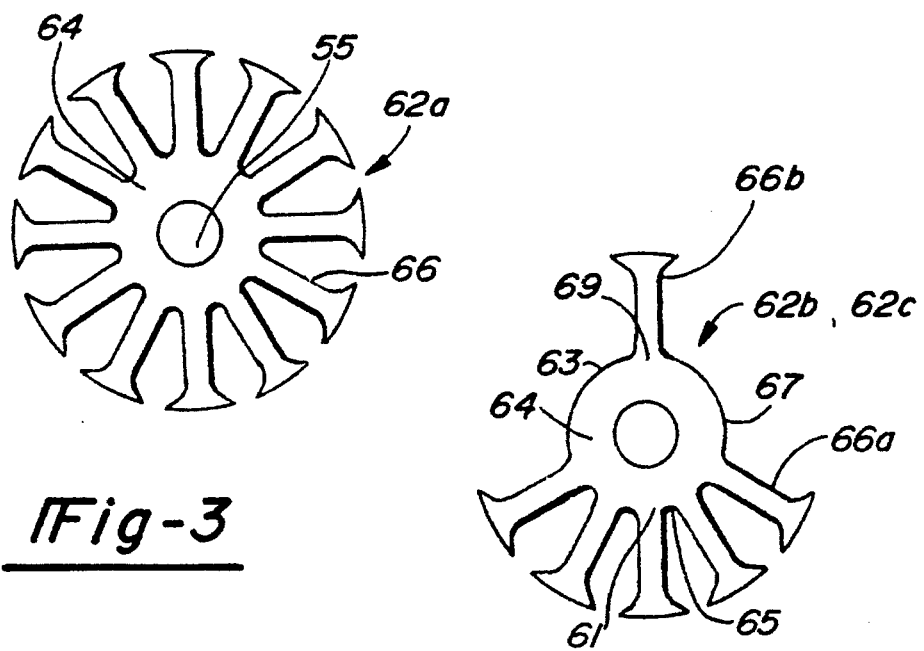
Fig-3
Fig-4

COUNTERBALANCED ELECTRIC MOTOR

TECHNICAL FIELD

The present invention relates generally to electric motors in general and, more particularly, to electric motors, of the type having an armature formed on a stack of steel laminations mounted on a shaft and requiring counterbalancing to minimize vibration and noise when the armature rotates during operation.

BACKGROUND ART

A common type of electric motor comprises a wire wound armature assembly rotatably disposed between a pair of diametrically opposed field magnets which generate a magnetic field through which the armature is caused to rotate when electric current is supplied to the wire wound about the armature through a commutator mounted to the armature shaft. The armature of such a motor about which the wire is wound is conventionally formed of a plurality of steel laminations stacked face to face along a portion of the armature shaft.

Typically, the laminations comprise identical flat spider-like plates, each lamination having an annular hub and a plurality of spokes, commonly T-shaped, extending radially outwardly from the hub at equally spaced intervals about the circumference of the hub. The hub of each lamination has a central hole sized to permit the lamination to be slipped onto the armature shaft. The laminations are typically stamped from a thin plate of sheet steel so as to be of uniform thickness and symmetric about a central axis extending longitudinally through the hub of the lamination and coincident with the longitudinal axis of the armature shaft when the laminations are stacked onto the armature shaft. Each T-shaped spoke has a radially extending stem and a cross arm extending circumferentially from the outboard end of the stem. Wire is wrapped tightly about the stems of the stacked laminations to form the armature winding, the wire being coated with an insulating layer, typically a polymer coating, to provide insulation between each of the wire windings and between the wire windings and the laminations.

In certain applications, such as for example on electric motors used to drive a brake fluid pump in a typical automotive antilock brake system, an eccentric secondary shaft, also referred to as an eccentric cam, is formed on the outboard end of the primary armature shaft for interfacing with the brake fluid pump. The armature shaft is integrally formed of the primary shaft portion on which the lamination stack is mounted and the secondary shaft portion extending eccentrically from one end of the primary shaft portion. The secondary shaft portion extends along a longitudinal axis which is parallel to, but displaced radially from, the longitudinally extending central axis of the primary shaft portion of the armature shaft. The presence of the eccentric shaft causes the armature assembly to be unbalanced. If uncompensated, this unbalance results in unacceptable noise and potentially damaging vibration when the armature rotates during operation of the motor.

Accordingly, it is common practice to add significant amounts of a material, such as a putty or a lead loaded epoxy, or some other form of a counterweight, at one or more selected locations on the armature assembly in an attempt to nominally counterbalance the effects of the eccentricity of the secondary shaft before the armature assembly is wound with wire and the commutator is added. After final assembly of the motor, the dynamic balance is fine tuned, commonly by shaving small amounts of material off the outer circumferential surface of the stack of lamination plates, thus ensuring a dynamically balanced motor thereby reducing vibration and noise during operation. However, without the initial balancing of the armature assembly per se by adding material, the amount of material that would typically have to be removed from the outer surface of the lamination stack during dynamic balancing would be excessive and prohibitive. Nevertheless, although necessary, the initial balancing of the armature assembly itself to nominally balance the armature assembly is time consuming and labor intensive, adds undesirable weight to the motor, and is often less than completely effective. Further, there is always the possibility that the added material or counterweight may become dislodged from the armature during the operational life of the motor and subsequently damage the motor.

SUMMARY OF THE INVENTION

It is an object of the present invention to provide an electric motor having an armature assembly which is nominally inherently balanced despite an eccentricity associated with the armature shaft.

It is a further object of the present invention to provide an armature assembly having an eccentric secondary shaft extending longitudinally from the primary armature shaft, which armature assembly is nominally balanced despite the presence of the eccentric shaft.

According to one aspect of the present invention, there is provided an armature assembly for an electric motor which is inherently balanced despite the presence of a eccentric shaft component. In an other aspect of the present invention, there is provided an electric motor having an armature assembly which is inherently balanced despite the presence of an eccentric shaft component.

The armature assembly comprises a longitudinally elongated armature shaft and a lamination stack mounted upon a substantially cylindrical primary shaft portion thereof extending along a central longitudinal axis. A secondary eccentric shaft portion extends longitudinally from the primary shaft portion along a second longitudinal axis parallel to and displaced from the central axis in a first radial direction.

The lamination stack, which is mounted on the primary shaft portion, is formed of a plurality of lamination plates arrayed in abutting face-to-face relationship. Each of a first portion of the lamination plates has a central annular hub portion having a central opening adapted to receive said primary shaft portion and a plurality of radially directed spokes extending outwardly from the hub portion at equally spaced intervals around the circumference of the hub portion, thereby forming a lamination plate which when mounted to the armature shaft is symmetric about the longitudinal axis of the primary shaft. These lamination plates form the main portion of the lamination stack and are typical of lamination plates commonly in use in small, fractional horsepower, direct current electric motors.

In accordance with the present invention, the lamination stack of the armature assembly is provided at at least the end thereof facing the eccentric end of the armature shaft, and most advantageously at both ends of the lamination stack, with lamination plates that are modified in that some of the radially directed spokes are removed along a selected portion or spaced portions of the circumferential extent of the hub portion so as to provide counterweight lamination plates having a spoke pattern which is not symmetric about the longitudinal axis of the primary shaft portion when the counterweight plates are mounted on the armature shaft. Most advantageously, each lamination plate has a plurality of radially directed spokes extending outwardly from the hub portion at equally spaced intervals over only a first limited extent of the circumference of the hub portion centered at a first circumferential location and at least one, and most advantageously only one, radially directed spoke extending outwardly from the hub portion at a second circumferential location centered diametrically opposite the first circumferential location, with the remaining circumferential extent of the hub being free of spokes.

So configured, the modified lamination plates constitute counterweights which when positioned and aligned on the armature shaft serve to counterbalance the effect of the eccentric secondary shaft portion on overall shaft balance. The modified lamination plates are disposed on the primary shaft portion as the outermost portions of the lamination stack, with the lamination plates facing toward the end of the primary shaft portion from which the eccentric secondary shaft portion extends being disposed in opposite alignment with the radial direction in which the eccentric shaft is offset from the primary shaft, while the laminations disposed on the opposite end of the primary shaft are aligned with the radial direction in which the eccentric shaft is offset from the primary shaft.

BRIEF DESCRIPTION OF THE DRAWINGS

The present invention will be described herein with reference to the drawing wherein:

FIG. 1 is a sectioned side elevational view of an electric motor having an armature assembly balanced in accordance with the present invention;

FIG. 3 is an elevational end view of a typical lamination plate taken from the central region of the lamination stack of FIG. 2;

FIG. 4 is an elevational end view of a lamination plate of the general type shown in FIG. 3 but as modified in accordance with the present invention;

DETAILED DESCRIPTION OF A PREFERRED EMBODIMENT

The invention will be described herein as applied to small fractional horsepower, direct current motors of the type commonly used in automotive antilock brake systems. It is to be understood, however, that the invention is generally applicable to any motor including an eccentric shaft or other imbalance creating component.

Figure 2:
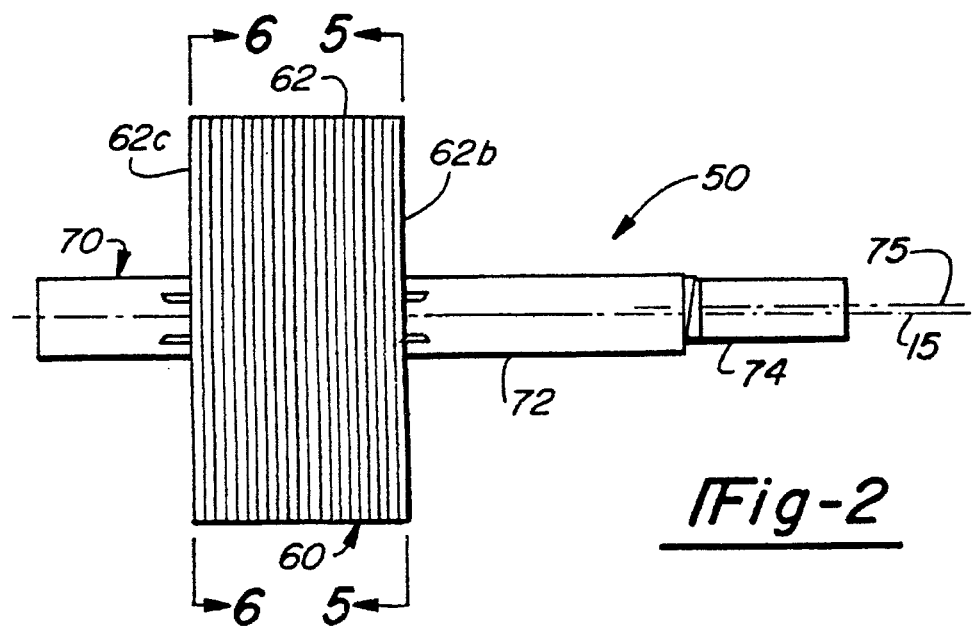
FIG. 2 is a sectioned side elevational view of a preferred embodiment of the armature assembly of the electric motor of FIG. 1.

Referring now to FIGS. 1 and 2, there is depicted therein a relatively typical two brush, two pole, single-speed, fractional horsepower, direct current motor 10 of the type commonly utilized in anti-lock brake systems on automobiles. The motor has a housing 12 enclosing a pair of opposed elongated magnet poles 20 mounted therein, each of the poles comprising permanent magnets typically being in the form of a section of a cylindrical shell. A wire wound armature 30 is disposed within the housing between the permanent magnets 20. The wire wound armature 30 is formed of a plurality of wire windings 33 supported on an armature assembly 50 having a lamination stack 60 mounted on a first portion 72 of an axially elongated shaft 70 which is supported for rotation about a central longitudinal axis 15 by bearings 42 and 44 mounted on the housing. A needle bearing 18, which interfaces with the hydraulic pump (not shown) of the anti-lock brake system, is mounted on a second portion 74 of the shaft 70 which extends longitudinally outwardly from the first shaft portion 72 in an eccentric manner as will be discussed in further detail hereinafter.

Electric current is supplied to the motor in the conventional manner through a pair of brushes 34 and 36, each of which has a face which seats against the outer surface of a commutator 38 mounted on the armature shaft 70. The wire wound armature 30 and the commutator 38 together form a rotor assembly which in operation of the motor rotates about the central axis 15 with the wire windings 33 being rotated within the magnetic field established by the permanent magnetic poles 20. In operation, current is supplied to the wire windings 33 in a conventional manner through the commutator 38 by supplying current from a power source, e.g. the vehicle's electrical system, to one of the brushes and completing the current circuit through the other brush as the ground brush.

Although the commutator 38 is illustrated in the drawings as a barrel-type commutator comprised of a plurality of axially extending, circumferentially arrayed, closely-spaced commutator bars radially outboard commutation contact surface, it is to be understood that the commutator could also be of the conventional disc type. Also, although shown as biased against the commutator by means of a common spring loaded brush card assembly, the particular form of the brushes and the supporting brush card is not germane to the present invention.

Referring now to FIGS. 2 and 3, the armature assembly 50 comprises a longitudinally elongated armature shaft 70 and a lamination stack 60 mounted thereupon. The shaft 70 includes a substantially cylindrical primary shaft portion 72 extending along a central longitudinal axis 15 and a secondary eccentric shaft portion 74 which extends longitudinally from the primary shaft portion 72 along a second longitudinal axis 75 parallel to and displaced from the central axis 15 in a first radial direction. The lamination stack 60 which is mounted on the primary shaft portion 72 is formed of a plurality of lamination plates 62 arrayed in abutting face-to-face relationship. Each of a first portion of the lamination plates 62A has a central annular hub portion 64 having a central opening 55 adapted to receive the primary shaft portion 72 and a plurality of radially directed spokes 66 extending outwardly from the hub portion 64 at equally spaced intervals around the circumference of the hub portion. When mounted on the armature shaft 70, the lamination plates 62A are symmetric about the longitudinal axis 15 of the armature shaft 70. The lamination plates 62A form the main portion of the lamination stack 60. The lamination plates 62A are typical of lamination plates commonly in use in small, fractional horsepower, direct current electric motors.

In accordance with the present invention, the lamination stack 60 of the armature assembly 50 is provided with modified laminations 62B at at least the end of lamination stack 60 facing the end of the armature shaft from which the eccentric secondary shaft 74 extends in a longitudinal direction, and most advantageously, the lamination stack 60 is further provided with modifications 62C at its other end, that is the end of the stack facing the end of the armature shaft opposite from the end from which the eccentric shaft 74 extends. The lamination plates 62B and 62C are modified in that some of the radially directed spokes 66 are removed along at least a selected portion of the circumferential extent of the hub portion 64 so as to provide counterweight plates. Advantageously, the lamination plates 62B and 62C are modified in that some of the radially directed spokes 66 are removed along selected spaced portions 63 and 67 of the circumferential extent of the hub portion 64 as illustrated in FIG. 4. Most advantageously, each lamination plate 62B and 62C has a plurality of radially directed spokes 66A extending outwardly from the hub portion 64 at equally spaced intervals over only a first limited extent 65 of the circumference of the hub portion 64 centered at a first circumferential location 61 and at least one, and most advantageously only one, radially directed spoke 66B extending outwardly from the hub portion 64 at a second circumferential location 69 centered diametrically opposite the first circumferential location 61.

Figures 5, 6:
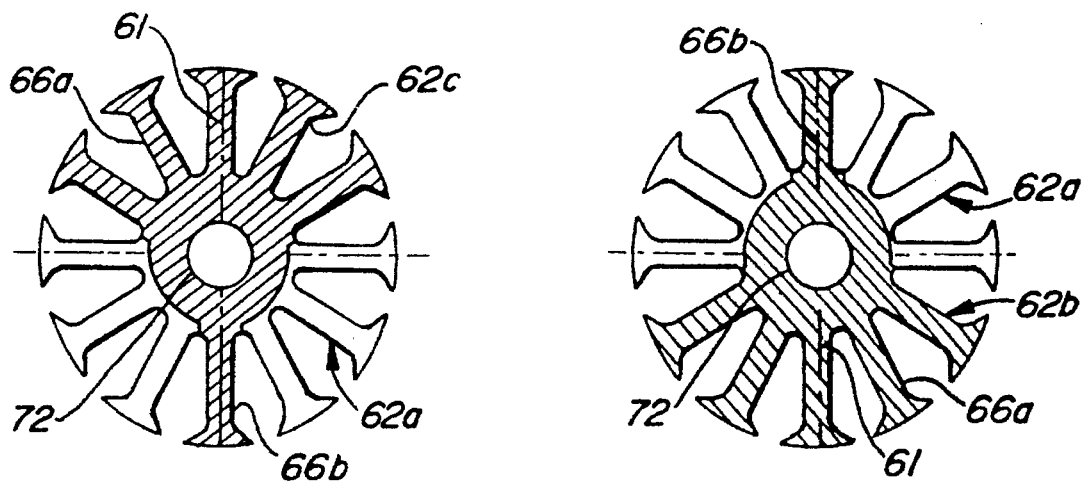
FIG. 5 is an end elevational view of the lamination stack of the preferred embodiment of the armature assembly of the present invention taken along line 5—5 of FIG. 2.
FIG. 6 is an end elevational view of the lamination stack of the preferred embodiment of the armature assembly of the present invention taken along line 6—6 of FIG. 2.

So configured, the modified lamination plates 62B and 62C are no longer symmetric about the longitudinal axis 15 of the armature shaft 70, but rather now constitute counterweights which when positioned and aligned on the armature shaft 70 serve to counterbalance the effect of the eccentric secondary shaft portion on overall shaft balance. Referring now to FIGS. 5 and 6, the modified lamination plates 62B and 62C are disposed on the primary shaft portion 72 as the outermost portions of the lamination stack 60, with the lamination plates 62B facing toward the end of the primary shaft portion 72 from which-the eccentric secondary shaft portion 74 extends being disposed in opposite alignment with the first radial direction in which the eccentric secondary shaft portion 74 is offset from the primary shaft, while the lamination plates disposed on the opposite end of the primary shaft portion 72 are aligned with the radial direction in which the eccentric secondary shaft portion 74 is offset from the primary shaft portion 72. As illustrated in FIG. 5, the lamination plates 62B are aligned such that the circumferential location 61, about which is centered the first limited circumferential extent from which the spokes 66A extend, is diametrically opposite the first radial direction in which the eccentric axis 75 is offset from the central axis 15. In the particular embodiment shown, the lamination plates 62C are accordingly aligned such that the circumferential location 61, about which is centered the first limited circumferential extent from which the spokes 66A extend, is in line with first the direction in which the eccentric axis 75 is offset from the central axis 15, that is diametrically reversed in alignment relative to the lamination plates 62B, as best illustrated in FIG. 6.

In a typical motor incorporating the armature assembly 50 of the present invention, a substantial majority of the lamination plates 62 will constitute conventional lamination plates 62A. The lamination plates 62A will form the interior portion of the lamination stack 60 and the modified lamination plates 62B and 62C will be disposed on the respective end regions only of the lamination stack 60. Although the particular number of modified lamination plates 62B and 62C which are required to nominally balance the armature assembly 50 will vary from application to application, the number of lamination plates 62B will exceed the number of lamination plates 62C.

As will be apparent to persons skilled in the art, various modifications and adaptations of the armature assembly and laminations hereinbefore described will become readily apparent without departure from the spirit and scope of the invention, the scope of which is defined in the appended claims.

I claim:

1. An armature assembly for an electric motor comprising:

a longitudinally elongated shaft having a substantially cylindrical primary shaft portion extending along a first central longitudinal axis and a secondary shaft portion extending longitudinally from said primary shaft portion along a second longitudinal axis parallel to and displaced from the first central axis in a first radial direction; and a lamination stack mounted on the primary shaft portion, said lamination stack formed of a plurality of lamination plates arrayed in abutting face-to-face relationship, each lamination plate of a first portion of the lamination plates having a central annular hub portion having a central opening adapted to receive said primary shaft portion and a plurality of radially directed spokes extending outwardly from the hub portion at equally spaced intervals around the circumference thereof, and each lamination of a second portion of the lamination plates lacking the radially directed spokes along selected portions of the circumferential extent thereof such that said second portion of the lamination plates and the lamination stack are unbalanced and the armature assembly is balanced upon rotation thereof.

2. An armature assembly as recited in claim 1 wherein each lamination plate of said second portion of the lamination plates has a central annular hub portion having a central opening adapted to receive said primary shaft portion, said hub portion having a first circumferential extent over which a plurality of radially directed spokes extend outwardly from the hub portion at equally spaced intervals, said first circumferential extent entered at a first circumferential location, and a second circumferential extent free of radially directed spokes extending therefrom.

3. An armature assembly as recited in claim 2 further comprising at least one radially directed spoke extending outwardly from the hub portion at a second circumferential location centered diametrically opposite the first circumferential location, said hub portion being free of radially extending spokes along said second circumferential extent and a third circumferential extent, each disposed between the first circumferential location and the second circumferential location.

4. An electric motor comprising:

at least two magnet poles disposed within a motor housing in cooperative relationship for establishing a magnetic field;

a rotor assembly having a wire winding disposed upon an axially elongated armature assembly having a lamination stack mounted upon an axially elongated armature shaft adapted for rotation about a longitudinally extending central axis within the magnetic field established by the magnet poles, and a commutator mounted on the said armature shaft and electrically connected to said wire winding; and a pair of brushes disposed in interfacing spaced relationship with a commutation surface of said commutator; characterized in that said armature shaft has a substantially cylindrical primary shaft portion extending along a first central longitudinal axis and a secondary shaft portion extending longitudinally from said primary shaft portion along a second longitudinal axis parallel to and displaced from the first central axis in a first radial direction; and said lamination stack is mounted on the primary shaft portion and is formed of a plurality of lamination plates arrayed in abutting face-to-face relationship, each lamination plate of a first portion of the lamination plates having a central annular hub portion having a central opening adapted to receive said primary shaft portion and a plurality of radially directed spokes extending outwardly from the hub portion at equally spaced intervals around the circumference thereof, and each lamination of a second portion of the lamination plates lacking the radially directed spokes along selected portions of the circumferential extent thereof such that said second portion of the lamination plates and the lamination stack are unbalanced and the armature assembly is balanced upon rotation thereof.

5. An electric motor as recited in claim 4 wherein each lamination plate of said second portion of the lamination plates of said lamination stack has a central annular hub portion having a central opening adapted to receive said primary shaft portion, said hub portion having a first circumferential extent over which a plurality of radially directed spokes extend outwardly from the hub portion at equally spaced intervals, said first circumferential extent centered at a first circumferential location, and a second circumferential extent free of radially directed spokes extending therefrom.

6. An electric motor as recited in claim 5 further comprising at least one radially directed spoke extending outwardly from the hub portion at a second circumferential location centered diametrically opposite the first circumferential location, said hub portion being free of radially extending spokes along said second circumferential extent and a third circumferential extent, each disposed between the first circumferential location and the second circumferential location.

7. An armature assembly for an electric motor comprising:

a longitudinally elongated shaft having a substantially cylindrical primary shaft portion extending along a first central longitudinal axis and a secondary shaft portion extending longitudinally from said primary shaft portion along a second longitudinal axis parallel to and displaced from the first central axis in a first radial direction; and a lamination stack mounted on the primary shaft portion, said lamination stack formed of a plurality of lamination plates arrayed in abutting face-to-face relationship, each lamination plate of a first portion of the lamination plates having a central annular hub portion having a central opening adapted to receive said primary shaft portion and a plurality of radially directed spokes extending outwardly from the hub portion at equally spaced intervals around the circumference thereof, and each lamination of a second portion of the lamination plates lacking the radially directed spokes along selected portions of the circumferential extent thereof, each lamination plate of said second portion of the lamination plates has a central annular hub portion having a central opening adapted to receive said primary shaft portion, said hub portion having a first circumferential extent over which a plurality of radially directed spokes extend outwardly from the hub portion at equally spaced intervals, said first circumferential extent centered at a first circumferential location, and at least one radially directed spoke extending outwardly from the hub portion at a second circumferential location centered diametrically opposite the first circumferential location, said hub portion being free of radially extending spokes along a second circumferential extent and a third circumferential extent, each disposed between the first circumferential location and the second circumferential location.

8. An electric motor comprising:

at least two magnet poles disposed within a motor housing in cooperative relationship for establishing a magnetic field;

a rotor assembly having a wire winding disposed upon an axially elongated armature assembly having a lamination stack mounted upon an axially elongated armature shaft adapted for rotation about a longitudinally extending central axis within the magnetic field established by the magnet poles, and a commutator mounted on the said armature shaft and electrically connected to said wire winding; and a pair of brushes disposed in interfacing spaced relationship with a commutation surface of said commutator; characterized in that said armature shaft has a substantially cylindrical primary shaft portion extending along a first central longitudinal axis and a secondary shaft portion extending longitudinally from said primary shaft portion along a second longitudinal axis parallel to and displaced from the first central axis in a first radial direction; and said lamination stack is mounted on the primary shaft portion and is formed of a plurality of lamination plates arrayed in abutting face-to-face relationship, each lamination plate of a first portion of the lamination plates having a central annular hub portion having a central opening adapted to receive said primary shaft portion and a plurality of radially directed spokes extending outwardly from the hub portion at equally spaced intervals around the circumference thereof, and each lamination of a second portion of the lamination plates lacking the radially directed spokes along selected portions of the circumferential extent thereof, each lamination plate of said second portion of the lamination plates of said lamination stack has a central annular hub portion having a central opening adapted to receive said primary shaft portion, said hub portion having a first circumferential extent over which a plurality of radially directed spokes extend outwardly from the hub portion at equally spaced intervals, said first circumferential extent centered at a first circumferential location, and at least one radially directed spoke extending outwardly from the hub portion at a second circumferential location centered diametrically opposite the first circumferential location, said hub portion being free of radially extending spokes along a second circumferential extent and a third circumferential extent, each disposed between the first circumferential location and the second circumferential location.

\* \* \* \* \*